US010788312B2

(12) United States Patent
Hidaka et al.

(10) Patent No.: US 10,788,312 B2
(45) Date of Patent: Sep. 29, 2020

(54) COORDINATE MEASURING UNIT AND METHOD FOR RECOGNIZING MEASURING PROBE

(71) Applicant: MITUTOYO CORPORATION, Kanagawa (JP)

(72) Inventors: Kazuhiko Hidaka, Kanagawa (JP); Satoshi Yoshitani, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 252 days.

(21) Appl. No.: 16/013,467

(22) Filed: Jun. 20, 2018

(65) Prior Publication Data

US 2018/0372480 A1    Dec. 27, 2018

(30) Foreign Application Priority Data

Jun. 23, 2017    (JP) .................................. 2017-123763

(51) Int. Cl.
*G01B 5/008* (2006.01)
*G01B 11/00* (2006.01)
(Continued)

(52) U.S. Cl.
CPC ............ *G01B 11/005* (2013.01); *G01B 5/008* (2013.01); *G01B 7/008* (2013.01); *G01B 21/042* (2013.01); *G01B 21/047* (2013.01); *G06F 21/73* (2013.01)

(58) Field of Classification Search
CPC ....... G01B 5/008; G01B 11/005; G01B 7/008
USPC .......................................................... 33/503
See application file for complete search history.

(56) References Cited

U.S. PATENT DOCUMENTS 4,599,524 A     7/1986  McMurtry
10,458,772 B2 * 10/2019 Cobb ................... G01B 21/047
(Continued)

FOREIGN PATENT DOCUMENTS

CN        1737582 A      2/2006
CN      101287958 A     10/2008
(Continued)

OTHER PUBLICATIONS

Jul. 31, 2019 European Office Action in counterpart European Application No. 18 179 009.8.
(Continued)

*Primary Examiner* — Christopher W Fulton
(74) *Attorney, Agent, or Firm* — Greenblum & Bernstein, P.L.C.

(57) ABSTRACT

A coordinate measuring unit includes a measuring probe and a processing device configured to compute the shape coordinates of an object to be measured on the basis of an output of the measuring probe. The measuring probe has a first identification code. The processing device includes a first determination portion configured to determine whether the first identification code outputted from the measuring probe is matched with a matching code, and a downstream determination portion configured to identify a second identification code outputted from the measuring probe to thereby recognize the measuring probe when the first identification code is matched with the matching code in the first determination portion and the measuring probe further has the second identification code. The coordinate measuring unit with the aforementioned configuration can efficiently recognize a number of measuring probes.

16 Claims, 8 Drawing Sheets

(51) Int. Cl.
*G01B 21/04* (2006.01)
*G01B 7/008* (2006.01)
*G06F 21/73* (2013.01)

(56) References Cited

U.S. PATENT DOCUMENTS

| | | |
|---|---|---|
| 2004/0185706 A1 | 9/2004 | Price et al. |
| 2006/0016276 A1 | 1/2006 | Mies |
| 2009/0049704 A1 | 2/2009 | Styles et al. |
| 2009/0070585 A1* | 3/2009 | Prestidge ............... G06F 21/44 713/168 |
| 2009/0241360 A1 | 10/2009 | Tait et al. |
| 2009/0287444 A1* | 11/2009 | Ishikawa ............. G01B 21/045 702/95 |
| 2014/0171802 A1* | 6/2014 | Kuroiwa ............... A61B 8/4411 600/459 |
| 2016/0076867 A1* | 3/2016 | Ruck .................... G01B 5/008 33/503 |
| 2016/0102965 A1* | 4/2016 | York .................... G01B 11/005 250/231.1 |

FOREIGN PATENT DOCUMENTS

| | | | |
|---|---|---|---|
| CN | 203313523 U | 11/2013 | |
| DE | 10057284 A1 | 5/2002 | |
| EP | 3421932 A1 * | 1/2019 | ............ G01B 5/008 |
| JP | 59-501874 A | 11/1984 | |
| JP | 62-502569 A | 10/1987 | |
| JP | 7-237067 A | 9/1995 | |
| WO | 87/01798 A1 | 3/1987 | |
| WO | 2009/059790 A2 | 5/2009 | |

OTHER PUBLICATIONS

Dec. 16, 2019 Chinese Office Action in Chinese Application No. 201810654941.5.
Nov. 5, 2018 Japanese Office Action in corresponding Japanese patent application No. 2017-123763 and translation.
Sep. 10, 2018 European Search Report in corresponding European Application No. 18179009.8, pp. 1-7.
May 18, 2020 Chinese Office Action in Chinese Application No. 201810654941.5 with machine translation.

* cited by examiner

COORDINATE MEASURING UNIT AND METHOD FOR RECOGNIZING MEASURING PROBE

CROSS-REFERENCE TO RELATED APPLICATION

The disclosure of Japanese Patent Application No. 2017-123763 filed on Jun. 23, 2017 including specifications, drawings and claims is incorporated herein by reference in its entirety.

TECHNICAL FIELD

The present invention relates to a coordinate measuring unit and a method for recognizing a measuring probe, and particularly, to a coordinate measuring unit and a method for recognizing a measuring probe which enable efficient recognition of a number of measuring probes.

BACKGROUND ART

The measuring probe for detecting the surface shape of an object to be measured is connected not only to the main body of a coordinate measuring machine but also, for example, to the main body of a machine tool, so as to function as a unit for measuring the three-dimensional shape of the object to be measured (referred to as the coordinate measuring unit). The measuring probe attached to each main body is first identified by a processing device connected to each main body. After that, the measuring probe is to detect the surface shape of the object to be measured. As disclosed in Japanese Translation of PCT Patent Application Publication No. Sho. 62-502569, the measuring probe conventionally includes a resistor having a resistance value specific to the type of each measuring probe, and the type of the measuring probe is recognized by measuring the resistance value. More specifically, the resistor is supplied with a current from a constant-current source, and the potential difference produced across the resistor is measured to thereby measure the resistance value and identify, from the resistance value, which type the measuring probe belongs to. That is, the measuring probe including a resistor enables the measuring probe to be recognized in a very simplified manner.

SUMMARY OF INVENTION

Technical Problem

However, the resistance values of respective resistors and the circuits for detecting the resistance values actually have errors, and the number of resistors that can be assigned to each practical measuring probe is limited. Furthermore, the resistance value assigned to a conventional measuring probe cannot be reassigned to a new measuring probe unless the conventional measuring probe is completely unavailable. That is, there was a possibility that the conventional method by assigning resistance values was applied to a number of new measuring probes with difficulty.

The present invention has been made to solve the conventional problems mentioned above, and it is therefore an object of the present invention to provide a coordinate measuring unit capable of efficiently recognizing a number of measuring probes and a method for recognizing the measuring probes.

Solution to Problem

To address the problems mentioned above, a first aspect of the present invention provides a coordinate measuring unit which includes a measuring probe and a processing device configured to compute shape coordinates of an object to be measured on the basis of an output of the measuring probe. The coordinate measuring unit is configured such that the measuring probe has a first identification code; and the processing device includes a first determination portion configured to determine whether the first identification code outputted from the measuring probe is matched with a matching code, and a downstream determination portion configured to identify a second identification code outputted from the measuring probe to thereby recognize the measuring probe when the first identification code is matched with the matching code in the first determination portion and the measuring probe further has the second identification code.

A second aspect of the present invention provides the coordinate measuring unit in which the processing device further includes a second determination portion configured to, when the first identification code is not matched with the matching code, identify the first identification code to thereby recognize the measuring probe.

A third aspect of the present invention provides the coordinate measuring unit in which the processing device further includes a selector unit configured to output the first identification code to the first determination portion when the first identification code is matched with the matching code, and to output the first identification code to the second determination portion when the first identification code is not matched with the matching code.

A fourth aspect of the present invention provides the coordinate measuring unit in which the first identification code is outputted as analog data from the measuring probe.

A fifth aspect of the present invention provides the coordinate measuring unit in which the second identification code is outputted as digital data from the measuring probe.

A sixth aspect of the present invention provides the coordinate measuring unit in which the processing device includes a communication portion configured to, when the first identification code is matched with the matching code in the first determination portion, send to the measuring probe a request for output of the second identification code and causes the measuring probe to output the second identification code.

A seventh aspect of the present invention provides the coordinate measuring unit in which the measuring probe includes a stylus module having a contact part configured to detect the object to be measured, and a probe main body configured to support the stylus module, and the second identification code includes specific information of the probe main body and specific information of the stylus module.

An eighth aspect of the present invention provides the coordinate measuring unit in which the specific information of the probe main body has information relating to at least one of a type, a shape, a weight, and a center of gravity of an entirety of the probe main body and an individual component of the probe main body, and in which the specific information of the stylus module has information relating to at least one of a type, a shape, a weight, and a center of gravity of an entirety of the stylus module and an individual component of the stylus module.

A ninth aspect of the present invention provides the coordinate measuring unit in which each of the specific information of the probe main body and the specific information of the stylus module further has manufacturer information.

A tenth aspect of the present invention provides the coordinate measuring unit in which the probe main body is made separable into a plurality of modules and the specific information of the probe main body further has information relating to the plurality of modules.

An eleventh aspect of the present invention provides the coordinate measuring unit in which the stylus module includes a stem configured to support the contact part and the specific information of the stylus module further has information relating to the stem.

A twelfth aspect of the present invention provides the coordinate measuring unit which further includes a storage portion configured to store calibration information of the measuring probe and in which the processing device reads the calibration information corresponding to the recognized measuring probe from the storage portion and computes the shape coordinates using the calibration information.

A thirteenth aspect of the present invention provides the coordinate measuring unit in which the processing device includes the downstream determination portions the number of which corresponds to the number of the measuring probes to be recognized.

To address likewise the problems mentioned above, a fourteenth aspect of the present invention provides a method for recognizing a measuring probe in a coordinate measuring unit configured to compute shape coordinates of an object to be measured on the basis of an output of a measuring probe, the method including: determining whether a first identification code which is outputted from the measuring probe and which the measuring probe has is matched with a matching code; and identifying a second identification code outputted from the measuring probe to thereby recognize the measuring probe when the first identification code is matched with the matching code by its determination and the measuring probe further has the second identification code.

A fifteenth aspect of the present invention provides the method for recognizing a measuring probe, the method further including, when the first identification code is not matched with the matching code by its determination, recognizing the measuring probe by identifying the first identification code.

A sixteenth aspect of the present invention provides the method for recognizing a measuring probe, the method further including, when the first identification code is matched with the matching code by the determination, requesting the measuring probe for output of the second identification code to thereby output the second identification code from the measuring probe.

According to the present invention, a number of measuring probes can be efficiently recognized. These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

With reference to the drawings, an example of an embodiment of the present invention will be described in more detail.

With reference to FIG. 1 to FIG. 9, a description will be given of a coordinate measuring machine according to the embodiment of the present invention.

First, a description will be given of the entire configuration of a coordinate measuring machine (coordinate measuring unit) 100 illustrated in FIG. 1.

Figure 1:
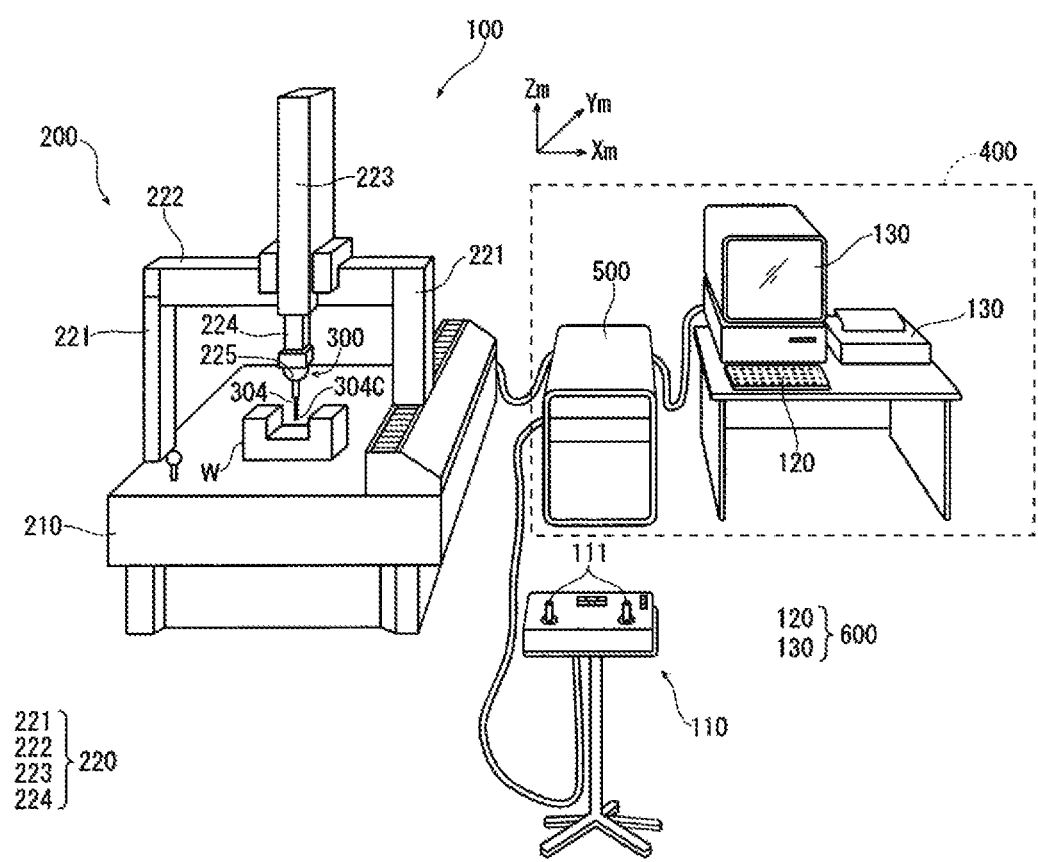
FIG. 1 is a schematic diagram illustrating an example of a coordinate measuring machine according to an embodiment of the present invention.

As shown in FIG. 1, the coordinate measuring machine 100 includes a measuring probe 300, a coordinate measuring machine main body 200 configured to move the measuring probe 300, an operation unit 110 having a joystick 111 configured to perform manual operation, and a processing device 400 configured to compute the shape coordinates of an object to be measured W on the basis of an output from the measuring probe 300.

A description will next be given of each component of the coordinate measuring machine 100.

Figure 2:
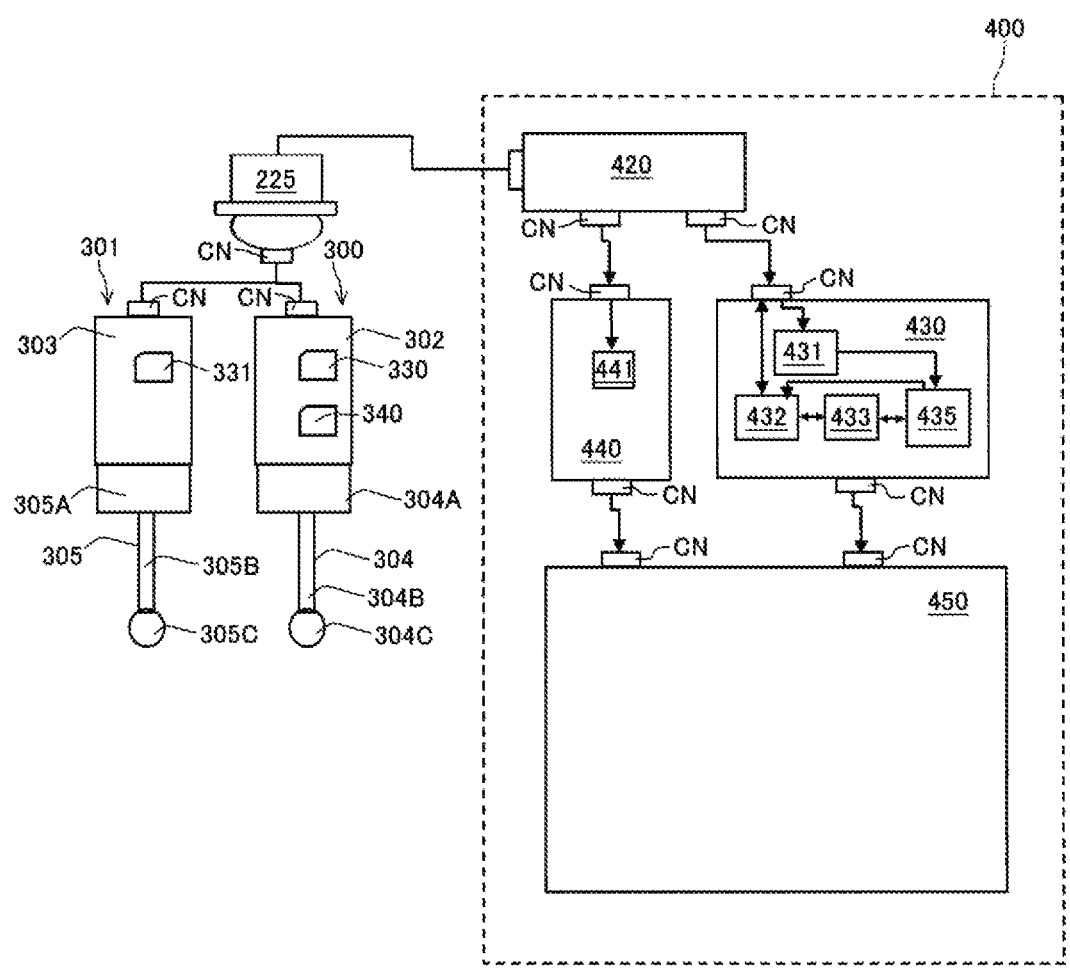
FIG. 2 is a block diagram relating to the recognition of the measuring probe by the coordinate measuring machine of FIG. 1.

As shown in FIGS. 1 and 2, the coordinate measuring machine main body 200 includes a surface plate 210, a drive mechanism 220, and the measuring probe 300 (301). As shown in FIGS. 1 and 2, the drive mechanism 220 includes an X-axis drive mechanism, a Y-axis drive mechanism, and a Z-axis drive mechanism (none of which are illustrated) which are erected on the surface plate 210 so as to hold and three-dimensionally move the measuring probe 300 (301).

More specifically, as shown in FIG. 1, the drive mechanism 220 includes beam supports 221 movable in the Ym direction of a machine coordinate system, a beam 222 bridged between the beam supports 221, a column 223 movable in the Xm direction of the machine coordinate system on the beam 222, and a spindle 224 movable in the Zm direction of the machine coordinate system in the column 223. Then, the X-axis drive mechanism, the Y-axis drive mechanism, and the Z-axis drive mechanism are provided between the beam 222 and the column 223, between the surface plate 210 and the beam supports 221, and between the column 223 and the spindle 224, respectively. Note that a probe head 225 is provided at an end of the spindle 224, and the measuring probe 300 (301) is supported on the end.

The measuring probe 300 is a so-called scanning probe configured to trace the surface of the object to be measured W. As shown in FIG. 2, the measuring probe 300 includes a probe main body 302, and a stylus module 304 movably supported by the probe main body 302. The stylus module 304 is connected to the probe main body 302 via a flange 304A and supports a stem 304B, and includes, at an end of the stem 304B, a spherical contact part 304C that is brought into contact with the object to be measured W in order to detect the object to be measured W. Note that the stylus module 304 can be replaced, as appropriate, with a stylus module that includes the stem 304B having an appropriate length and shape for measurement of an individual object to be measured W (for example, a stem including a joint that enables bending in any direction or a stem that is divided into five branches).

Figure 3:
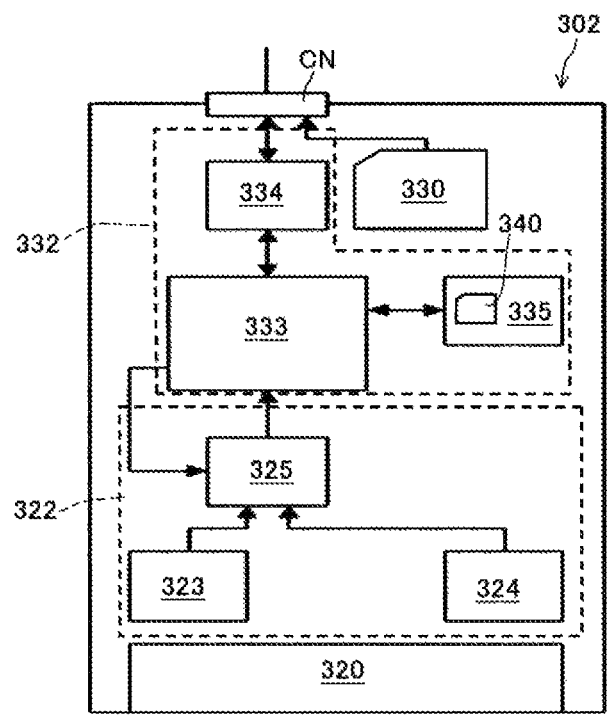
FIG. 3 is a block diagram illustrating the probe main body of the measuring probe of FIG. 2.

As shown in FIG. 2, the probe main body 302 is connected to the probe head 225 and supported with a connector CN provided therebetween. The probe main body 302 has a first identification code 330 and a second identification code 340. More specifically, as shown in FIG. 3, the probe main body 302 includes a suspension mechanism 320, a measurement unit 322, the first identification code 330, and a communication unit 332. The probe main body 302 is supplied with power from the coordinate measuring machine main body 200 or the processing device 400 via the connector CN.

The suspension mechanism 320 illustrated in FIG. 3 supports the stylus module 304 so as to be displaceable in any direction relative to the probe main body 302.

As shown in FIG. 3, the measurement unit 322 includes analog sensors 323 and 324, and an ADC 325. The analog sensors 323 and 324 detect a change in the position of the stylus module 304. The ADC 325 is a converter (analog-to-digital converter) configured to convert an analog output signal from the analog sensors 323 and 324 to a digital signal.

As shown in FIG. 3, the first identification code 330 is shown, for example, by a resistor. The resistance value of the resistor is identified by the processing device 400. That is, the first identification code 330 is to be outputted as analog data from the measuring probe 300. Note that since the measuring probe 300 has the second identification code 340, the first identification code 330 is adapted to be matched (coincide) with a matching code MC that is positively identified by a particular resistance value.

As shown in FIG. 3, the communication unit 332 includes a processing portion 333, a communication portion 334, and a storage portion 335 configured to store the second identification code 340. For example, the processing portion 333 may be an FPGA (may also be a PLC, an ASIC, or a microcomputer). The processing portion 333 processes signals from the ADC 325 and produces a probe signal PS. Furthermore, the processing portion 333 controls the communication portion 334 and the storage portion 335, and outputs from the communication portion 334, as appropriate, the probe signal PS or various types of information stored in the storage portion 335, for example, to the processing device 400 external to the measuring probe 300. For example, the communication portion 334 employs the RS485 scheme (may also employ other communication schemes such as the RS232C or I²C) to perform serial communications. In this embodiment, the communication portion 334 receives a transmission request from the processing device 400 and then outputs various signals (including data or codes) to the processing device 400 (i.e., the second identification code 340 is outputted as digital data from the measuring probe 300).

Figure 4:
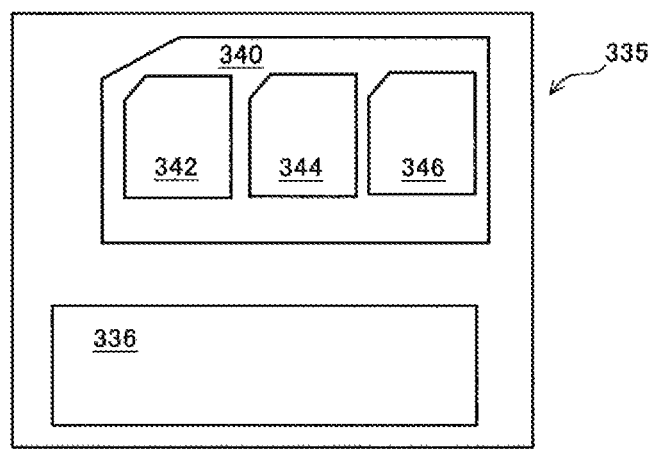
FIG. 4 is a schematic diagram illustrating the configuration of a storage portion of FIG. 3.

As shown in FIG. 4, the storage portion 335 stores calibration information 336 and the second identification code 340. The calibration information 336 serves to calibrate the measuring probe 300 and is outputted to the processing device 400 after the second identification code 340 is processed and then identified by the processing device 400. The second identification code 340 includes specific information 342 of the probe main body 302, specific information 344 of the stylus module 304, and other supplementary specific information 346 that is set as required. The specific information 342 of the probe main body 302 has information relating to at least one of the type, shape, weight, and center of gravity of the entirety of the probe main body 302 and an individual component of the probe main body 302, and the specific information 344 of the stylus module 304 has information relating to at least one of the type, shape, weight, and center of gravity of the entirety of the stylus module 304 and an individual component of the stylus module 304. In this embodiment, the probe main body 302 is a single entity, and the specific information 342 is adapted to have information relating to the type, shape, weight, and center of gravity of the entirety of the probe main body 302. However, when the probe main body 302 is separable into a plurality of modules, the specific information 342 further has information relating to the plurality of modules. That is, at that time, the specific information 342 is adapted to have information relating to the type, shape, weight, and center of gravity of each individual component (individual module) of the probe main body 302. Meanwhile, the specific information 344 is adapted to have information relating to the type, shape, weight, and center of gravity of each individual component of the flange 304A, the stem 304B, and the contact part 304C, and information relating to the type, shape, weight, and center of gravity of the entirety of the stylus module 304 (thus, the specific information 344 also has information relating to the stem 304B). Furthermore, each of the specific information 342 of the probe main body 302 and the specific information 344 of the stylus module 304 has manufacturer information.

Note that for example, when there exists a plurality of stylus modules 304 that can be connected to the probe main body 302, it is possible in the storage portion 335 to select the specific information 344 of a connected stylus module 304. At that time, for example, the following technique can be employed. First, a simplified mark (for example, an optical or magnetic barcode) is provided on the surface of the flange 304A of the stylus module 304. The mark is then read with a sensor (not illustrated), provided on the probe main body 302, at the time of connection of the stylus module 304. On the basis of the result of the reading, the specific information 344 of the actually connected stylus module 304 is selected from a plurality of pieces of specific information 344 stored in the storage portion 335.

Note that the measuring probe 301 illustrated in FIG. 2 does not have the second identification code but has only the first identification code 331. The measuring probe 301 is configured generally in the same manner as the measuring probe 300 except that the measuring probe 301 does not have the second identification code. Thus, it is possible to selectively connect either the measuring probe 300 or the measuring probe 301 to the coordinate measuring machine main body 200.

As shown in FIG. 1, the operation unit 110 is connected to the processing device 400. It is possible to input various commands from the operation unit 110 to the coordinate measuring machine main body 200 and the processing device 400.

As shown in FIG. 1, the processing device 400 includes a motion controller 500 and a host computer 600. Then, the processing device 400 computes the shape coordinates of the object to be measured W on the basis of the output from the measuring probe 300 (301) including the probe signal PS and the amount of three-dimensional displacement of the measuring probe 300 (301) itself by the drive mechanism 220. The motion controller 500 mainly controls the three-dimensional displacement and the motion, at the time of measurement, of the measuring probe 300 (301) itself in response to a displacement command from the host computer 600. Meanwhile, the host computer 600 mainly processes the measurement result acquired by the coordinate measuring machine main body 200. In this embodiment, FIG. 2 illustrates a block diagram relating to the recognition of the measuring probe 300 (301) by the processing device 400, and a description thereof will be given below. Note that the host computer 600 includes an input unit 120 such as a keyboard, and an output unit 130 such as a display or a printer.

As shown in FIG. 2, the processing device 400 includes a selector unit 420, a plurality of (two in this embodiment) probe signal processing interface (I/F) units 430 and 440, and a processing main body unit 450. The selector unit 420 is readily detachable, and the number of the probe signal processing I/F units 430 and 440 varies depending on the number of types of measuring probes 300 (301) that are used at a time.

Figure 5:
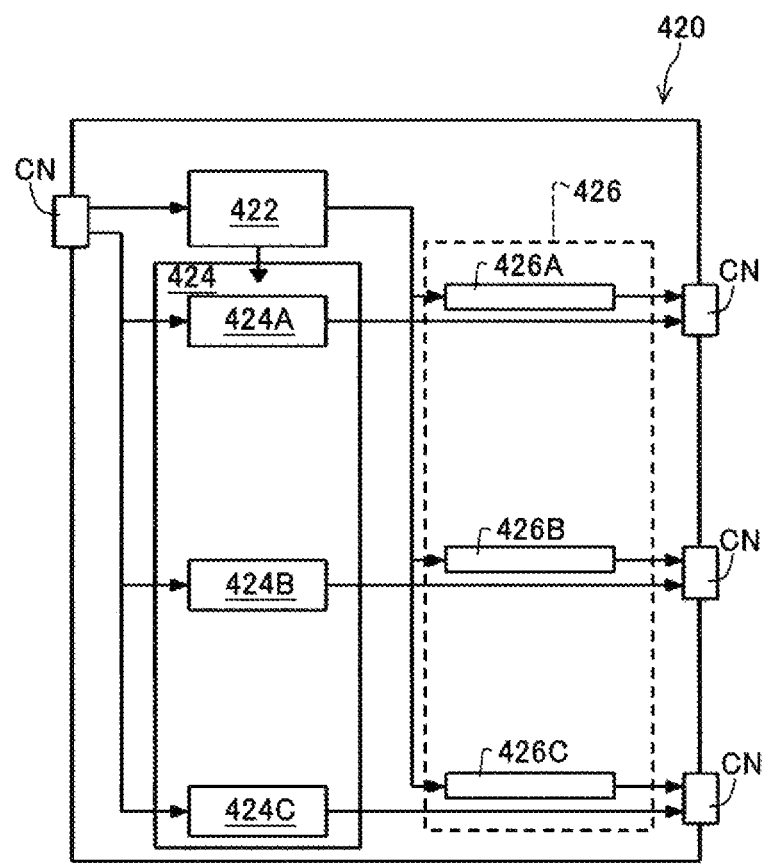
FIG. 5 is a block diagram illustrating a selector unit of a processing device of FIG. 2.

As shown in FIGS. 2 and 5, when having determined that the first identification code 330 (331) of the measuring probe 300 (301) is matched with the matching code MC, the selector unit 420 determines that the measuring probe 300 (301) connected to the probe head 225 is the measuring probe 300, and then outputs the first identification code (330) to a first determination portion 431 of the probe signal processing I/F unit 430. In contrast to this, when having determined that the first identification code 330 (331) of the measuring probe 300 (301) is not matched with the matching code MC, the selector unit 420 determines that the measuring probe 300 (301) connected to the probe head 225 is the measuring probe 301, and then outputs the first identification code (331) to a second determination portion 441 of the probe signal processing I/F unit 440.

Specifically, as shown in FIG. 5, the selector unit 420 includes a determination portion 422, a relay portion 424, and a setting portion 426. The determination portion 422 identifies the first identification code 330 (331) of the measuring probe 300 (301). More specifically, the determination portion 422 compares the potential difference caused by the resistance value corresponding to the first identification code 330 (331) with a reference voltage serving as a reference, and then identifies the first identification code 330 (331) from the comparison result. On the basis of the first identification code 330 (331) thus identified, either one of the plurality of the probe signal processing I/F units 430 and 440 to be connected to the selector unit 420 is effectively connected thereto by the relay portion 424. The setting portion 426 sets the first identification code 330 (331) to the probe signal processing I/F unit 430 or 440 again. In this embodiment, the relay portion 424 includes a first relay portion 424A, a second relay portion 424B, and a third relay portion 424C. Furthermore, the setting portion 426 includes a first setting portion 426A, a second setting portion 426B, and a third setting portion 426C. Thus, it is possible to connect three probe signal processing I/F units 430, 440, and the like to the connector CN of the selector unit 420 (the present invention is not limited thereto, and more than three probe signal processing I/F units may also be connected to the selector unit).

Figure 6:
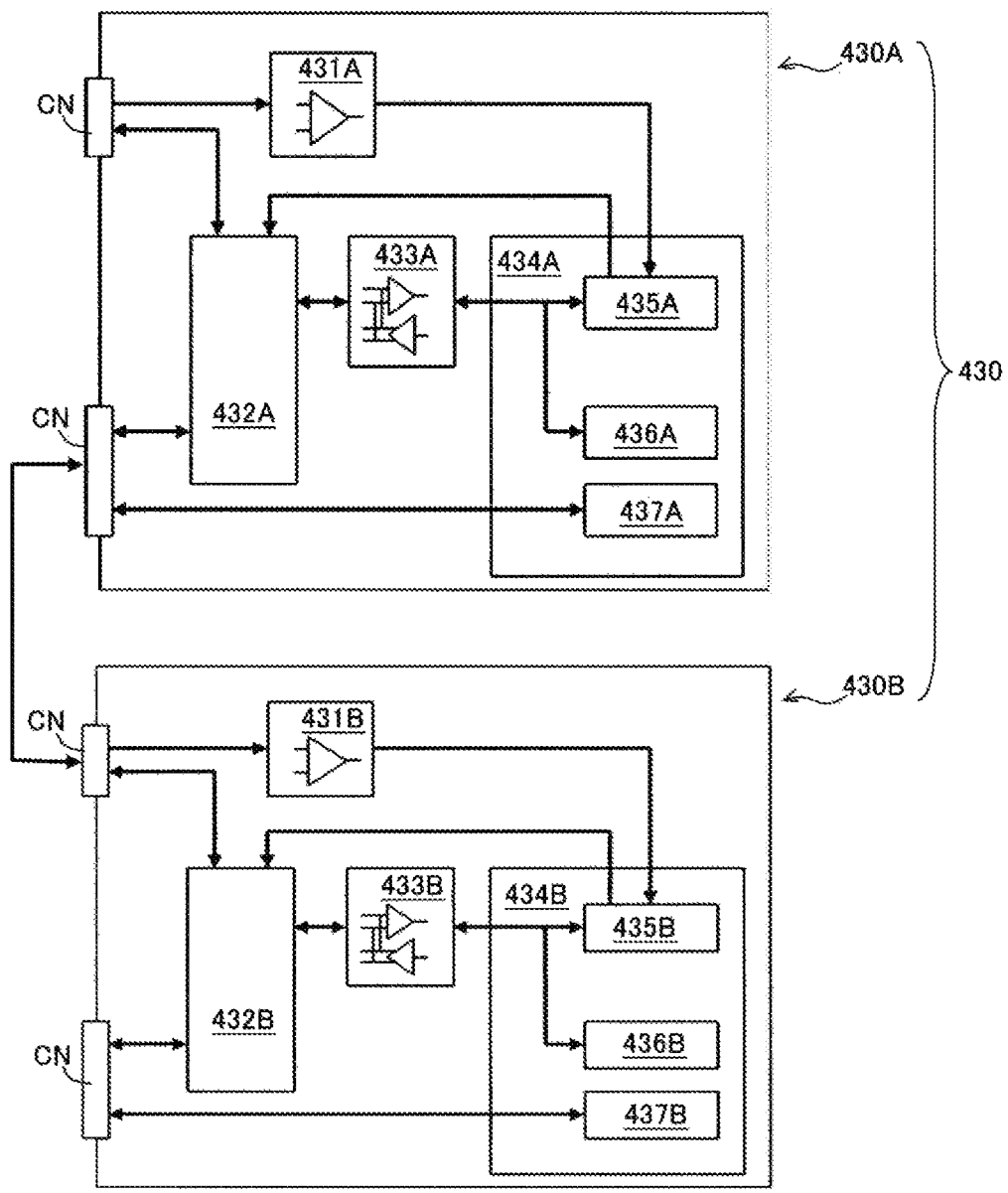
FIG. 6 is a block diagram illustrating a probe signal processing interface (I/F) unit of the processing device of FIG. 2.

As shown in FIG. 2, the probe signal processing I/F unit 430 includes the first determination portion 431, a relay portion 432, a communication portion 433, and a downstream determination portion 435. Note that in this embodiment, as shown in FIG. 6, the probe signal processing I/F unit 430 is configured from one master I/F unit 430A and one or more slave I/F units 430B. The master I/F unit 430A includes a first determination portion 431A, a relay portion 432A, a communication portion 433A, and a downstream determination portion 435A of a processing portion 434A. The master I/F unit 430A and the slave I/F unit 430B have generally the same outer shape and configuration, and the total number of master I/F units 430A and slave I/F units 430B is prepared corresponding to the number of the second identification codes 340. That is, the processing device 400 includes the downstream determination portions 435 the number of which corresponds to the number of the measuring probes 300 to be recognized (each having a specific second identification code 340). For example, in the processing device 400, the master I/F unit 430A is connected in series to the slave I/F unit 430B upstream thereof and identifies the first identification code and the second identification code prior to the slave I/F unit 430B.

A description will next be given of the master I/F unit 430A below.

As shown in FIG. 6, the first determination portion 431A determines whether the first identification code 330 outputted from the measuring probe 300 is matched with the matching code MC. That is, the first determination portion 431A has generally the same function as that of the determination portion 422. Note that it is also possible to eliminate the first determination portion 431A which has the function that overlaps that of the determination portion 422 of the selector unit 420.

As shown in FIG. 6, when the first determination portion 431A has determined that the first identification code 330 is matched with the matching code MC, the relay portion 432A enables communications between the communication portion 433A and the communication portion 334 of the measuring probe 300. The relay portion 432A also controls the reception state of the probe signal PS in the processing portion 434A according to whether or not the second identification code 340 is identified by the downstream determination portion 435A of the processing portion 434A. Note that the relay portion 432A has generally the same function as that of the first relay portion 424A.

As shown in FIG. 6, when the first determination portion 431A has determined that the measuring probe connected to the probe head 225 is the measuring probe 300, the communication portion 433A sends, to the measuring probe 300, a request for output of the second identification code 340, so that the measuring probe 300 is caused to output the second identification code 340. Note that the communication portion 433A has generally the same function as that of the communication portion 334.

As shown in FIG. 6, the processing portion 434A includes the downstream determination portion 435A, a probe signal processing portion 436A, and an I/F control portion 437A, thus having generally the same function as that of the processing portion 333.

As shown in FIG. 6, when the first determination portion 431A has determined that the first identification code 330 is matched with the matching code MC, the downstream determination portion 435A identifies the second identification code 340 outputted from the measuring probe 300 via the communication portion 433A. That is, when the first identification code 330 is matched with the matching code MC and the measuring probe 300 further has the second identification code, the downstream determination portion 435A identifies the second identification code outputted from the measuring probe 300 to thereby recognize the measuring probe 300. Furthermore, the downstream determination portion 435A controls the relay portion 432A.

As shown in FIG. 6, the probe signal processing portion 436A reads the calibration information 336 stored in the storage portion 335 of the measuring probe 300, and then calibrates the probe signal PS on the basis of the calibration information 336. That is, the processing device 400 reads the calibration information 336 corresponding to the measuring probe 300, which has been recognized, from the storage portion 335, and then computes the shape coordinates on the basis of the calibration information 336. Note that it is also possible for the motion controller 500 to calibrate the probe signal PS on the basis of the calibration information 336.

The I/F control portion 437A illustrated in FIG. 6 exchanges, with the measuring probe 300, a signal that enables determination as to which of the master I/F unit 430A and the slave I/F unit 430B is effective. For example, when the second identification code 340 is successfully identified by the downstream determination portion 435A, the I/F control portion 437A outputs a control assignment signal HC. When the second identification code 340 was not successfully identified by the downstream determination portion 435A, the I/F control portion 437A outputs a decode command signal AO. Note that upon reception of the decode command signal AO from the master I/F unit 430A (and a serially connected upstream slave I/F unit), an I/F control portion 437B of the slave I/F unit 430B operates to identify the second identification code 340.

As described above, the identification of the second identification code 340 is firstly done by the master I/F unit 430A that is disposed upstream of the aforementioned serial connection. At the same time, the master I/F unit 430A and the slave I/F unit 430B are controlled, for example, by the decode command signal AO. Thus, even in the presence of the master I/F unit 430A and a plurality of slave I/F units 430B, the operation to identify the second identification code 340 can be smoothly performed without any operational collision with each other.

As shown in FIG. 2, the probe signal processing I/F unit 440 includes the second determination portion 441 for recognizing the measuring probe 301. When the first identification code 331 is not matched with the matching code MC, the second determination portion 441 identifies the first identification code 331 to recognize the measuring probe 301. The second determination portion 441 is configured generally in the same manner as the first determination portion 431 and compares a potential difference caused by a resistance value not corresponding to a matching code MC with another reference potential serving as another reference, thereby identifying the first identification code 331 from the comparison result. The probe signal processing I/F unit 440 allows the second determination portion 441 to identify the first identification code 331 and a probe signal processing portion (not shown) to process the probe signal PS. Note that the probe signal processing I/F unit 440 may exchange, with an I/F control portion (not shown), a signal that enables determining as to which of the probe signal processing I/F units 430 and 440 is effective.

As shown in FIG. 2, the processing main body unit 450 is connected to the probe signal processing I/F units 430 and 440. The processing main body unit 450 controls and processes the recognition of the measuring probes 300 and 301 which is performed by the probe signal processing I/F units 430 and 440. For example, the processing main body unit 450 reflects the calibration value of the probe signal PS and combines the output of the measuring probe 300 (301) with the amount of three-dimensional displacement by the drive mechanism 220. Note that the processing main body unit 450 causes the output portion 130 to output an error signal when the state with no control assignment signal HC received continues for a predetermined duration or longer.

Figure 7:
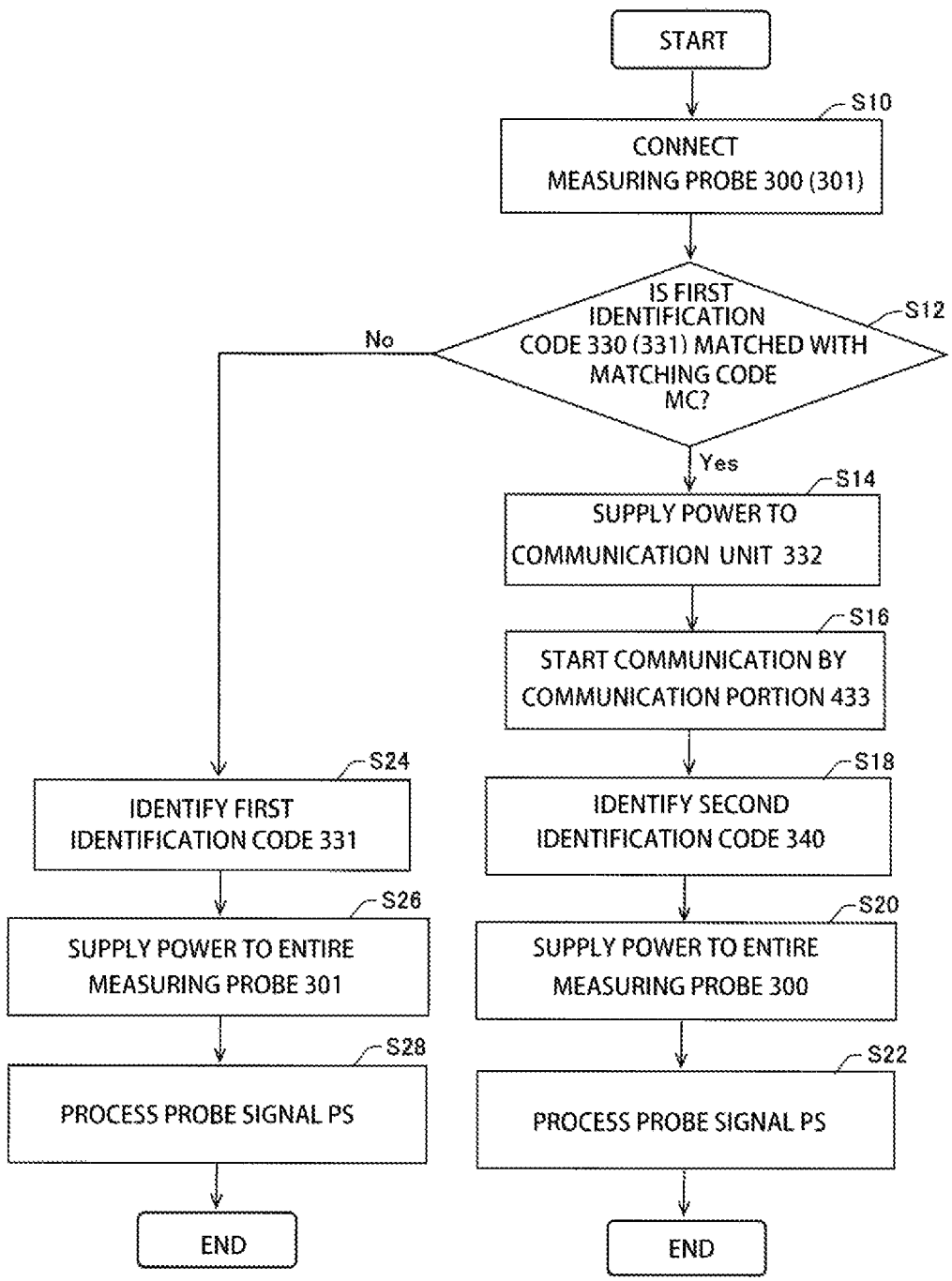
FIG. 7 is a flow diagram showing an example of a procedure for recognizing the measuring probe when the measuring probe is connected to the coordinate measuring machine of FIG. 1.

With reference mainly to FIG. 7, a description will next be given of the procedure of recognizing the measuring probe 300, 301.

First, the measuring probe 300 (301) is connected to the coordinate measuring machine main body 200 (FIG. 7, step S10).

Then, the selector unit 420 supplies power to a resistor corresponding to the first identification code 330 (331) of the measuring probe 300 (301). Then, the process determines whether the first identification code 330 (331) outputted from the measuring probe 300 (301) is matched with the matching code MC (FIG. 7, step S12).

Then, when the determination (its determination) shows that the first identification code 330 (331) is matched with the matching code MC and the measuring probe 300 further has the second identification code 340, the process identifies the second identification code 340 outputted from the measuring probe 300 to thereby recognize the measuring probe 300.

A description will be given below in more detail.

First, when the determination shows that the first identification code 330 (331) is matched with the matching code MC, the selector unit 420 outputs the first identification code 330 to the first determination portion 431 of the probe signal processing I/F unit 430. Then, the first determination portion 431 of the probe signal processing I/F unit 430 checks (determines) again that the first identification code 330 is matched with the matching code MC. When the first identification code 330 is matched with the matching code MC, the probe signal processing I/F unit 430 supplies power to the communication unit 332 of the measuring probe 300 (FIG. 7, step S14).

Then, the communication portion 433 starts communications with the communication portion 334 via the relay portion 432 (FIG. 7, step S16). More specifically, the communication portion 433 transmits an output request for the second identification code 340 to the communication portion 334, so that the communication portion 334 is caused to output the second identification code 340.

Then, the process identifies the second identification code 340 (FIG. 7, step S18). Then, the process recognizes the measuring probe 300. This processing will be discussed later with reference to FIGS. 8 and 9. In this embodiment, when the first identification code 330 is matched with the matching code MC, it is ensured that the second identification code 340 exists in the measuring probe 300. That is, it can also be said that to check that the first identification code 330 is matched with the matching code MC is to check whether or not the second identification code 340 is found in the measuring probe 300. Note that if the second identification code 340 is not found in the measuring probe 300 even when the first identification code 330 is matched with the matching code MC (including the case where the second identification code 340 cannot be identified even when the code exists), the probe signal processing I/F unit 430 can produce an error signal and output the error state to the output unit 130.

Then, the probe signal processing I/F unit 430 supplies power to the entire measuring probe 300 (FIG. 7, step S20). Since the communication unit 332 of the measuring probe 300 is supplied with power, the probe signal processing I/F unit 430 supplies power to the measurement unit 322 of the measuring probe 300.

Then, the probe signal processing I/F unit 430 causes the measuring probe 300 to output the probe signal PS. Then, the probe signal processing portion 436A, 436B processes the probe signal PS (FIG. 7, step S22).

Note that when the first identification code 330 (331) is not matched with the matching code MC, the selector unit 420 outputs the first identification code 331 to the second determination portion 441 of the probe signal processing I/F unit 440. Then, when the determination shows that the first identification code 331 is not matched with the matching code MC, the first identification code 331 is identified to thereby recognize the measuring probe 301.

A description will next be given in more detail below.

First, the process identifies that the determination shows that the first identification code 330 (331) is not matched with the matching code MC, and the selector unit 420 has another code. The selector unit 420 outputs the first identification code 331 to the second determination portion 441 of the probe signal processing I/F unit 440 corresponding to the another code. Then, the second determination portion 441 identifies again that the first identification code 331 is another code different from the matching code MC (FIG. 7, step S24).

Then, the probe signal processing I/F unit 440 supplies power to the entire measuring probe 301 (FIG. 7, step S26).

Then, the probe signal processing I/F unit 440 causes the measuring probe 301 to output the probe signal PS. Then, the probe signal processing portion of the probe signal processing I/F unit 440 processes the probe signal PS (FIG. 7, step S28).

Figure 8:
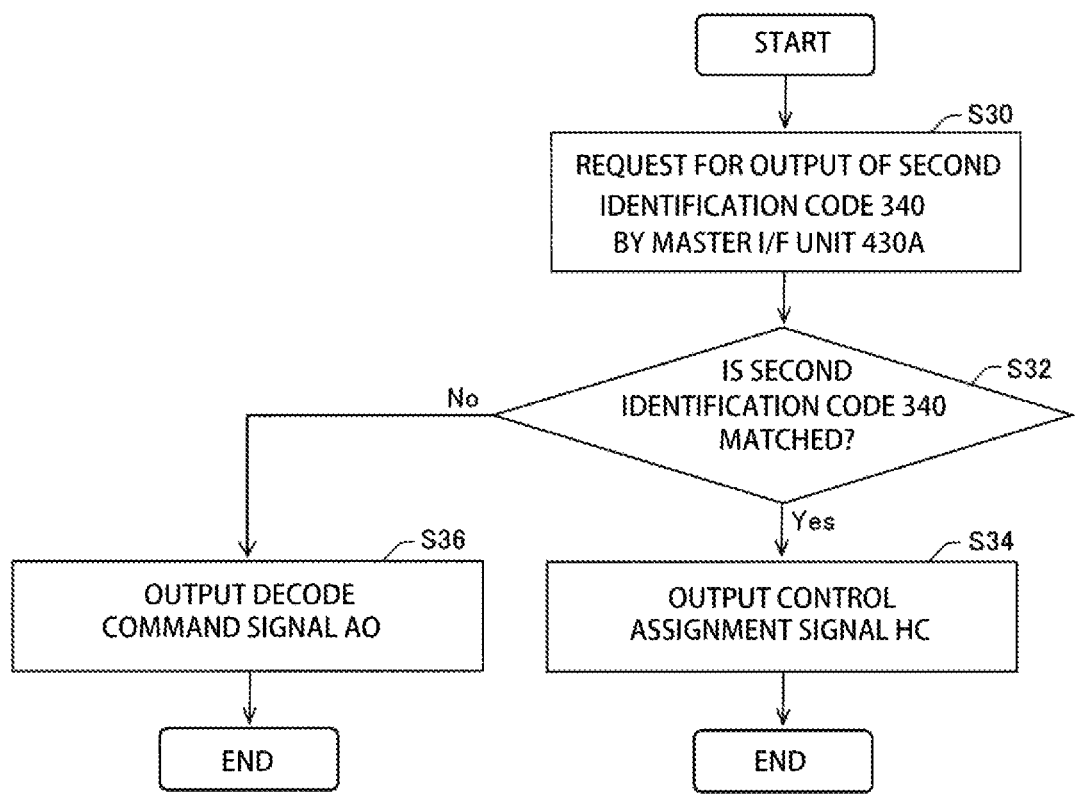
FIG. 8 is a flow diagram showing an example of a procedure for identifying a second identification code of FIG. 7 in a master I/F unit of the probe signal processing I/F unit.
Figure 9:
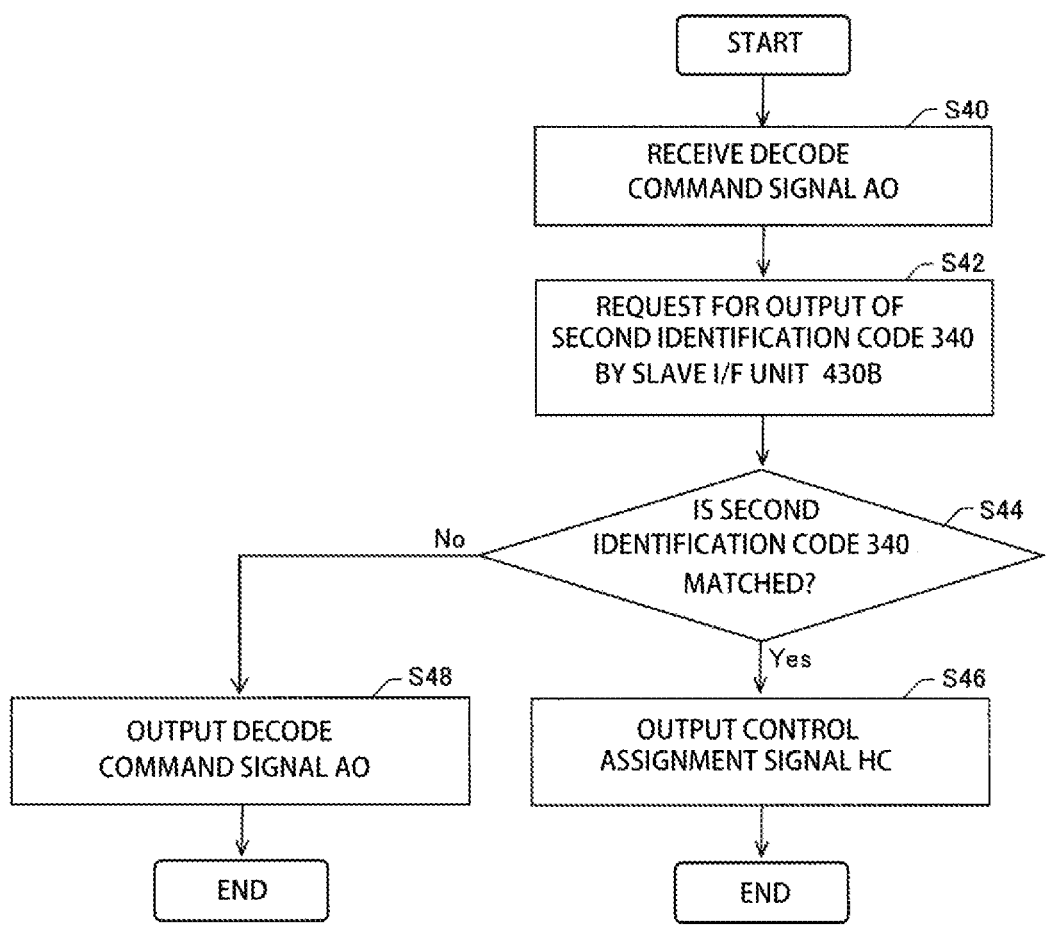
FIG. 9 is a flow diagram showing an example of a procedure for identifying a second identification code in the master I/F unit of FIG. 8 onward in a slave I/F unit of the probe signal processing I/F unit.

With reference to FIGS. 8 and 9, a description will next be given of the processing for identifying the second identification code 340.

First, the communication portion 433A of the master I/F unit 430A requests the communication portion 334 of the measuring probe 300 to output the second identification code 340 (FIG. 8, step S30).

Then, the downstream determination portion 435A determines the matching of the second identification code 340 outputted from the measuring probe 300 (FIG. 8, step S32). For example, the downstream determination portion 435A reads an equivalent code corresponding to the second identification code 340 stored in a storage portion (not shown) and then compares the resulting code with the second identification code 340. Then, the comparison result indicative of coinciding (FIG. 8, Yes in step S32) shows the matching and identifying of the second identification code 340. This causes the I/F control portion 437A of the master I/F unit 430A to output the control assignment signal HC (FIG. 8, step S34). At this time, the master I/F unit 430A itself has identified the second identification code 340 and is thus to also process the probe signal PS.

The comparison result indicative of no coinciding (FIG. 8, No in step S32) shows that the second identification code 340 has not been identified. This causes the I/F control portion 437A to output the decode command signal AO (FIG. 8, step S36). At this time, the master I/F unit 430A identifies no second identification code 340 and is thus to also process no probe signal PS.

Then, the I/F control portion 437B of the slave I/F unit 430B connected downstream of the master I/F unit 430A receives the decode command signal AO (FIG. 9, step S40). Subsequently, the processing in the slave I/F unit 430B (FIG. 9, steps S42 to S48) is the same as the processing in the master I/F unit 430A (FIG. 8, steps S30 to S36), and thus will not be repeatedly described. Note that when the slave I/F unit 430B also processes no probe signal PS, the processing will be performed by another slave I/F unit connected in series downstream of the slave I/F unit 430B.

As described above, in this embodiment, the processing device 400 includes the first determination portion 431, and the downstream determination portion 435 that identifies the second identification code 340 to thereby recognize the measuring probe 300 when the first identification code 330 is matched with the matching code MC and the measuring probe 300 further has the second identification code 340. That is, in this embodiment, it is possible to recognize an enormous number of measuring probes 300 with a combination of the first identification code 330 and the second identification code 340. Furthermore, in this embodiment, since the second identification code 340 is identified when the first identification code 330 is matched with the matching code MC, the downstream determination portion 435 does not need to operate for the measuring probe 301 having no second identification code 340. It is therefore possible to recognize the measuring probe 300 efficiently by the processing device 400. Furthermore, in this embodiment, even the measuring probe 301 having no second identification code 340 can constitute the coordinate measuring machine 100.

Furthermore, in this embodiment, the processing device 400 is provided, in the probe signal processing I/F unit 440, with the second determination portion 441 configured to recognize the measuring probe 301. That is, in this embodiment, it is possible to recognize the measuring probe 301 even for the measuring probe 301 having no second identification code 340. Note that the present invention is not limited thereto and, when only measuring probes having both the first and second identification codes are connected to the coordinate measuring machine main body, the probe signal processing I/F unit including the second determination portion may be eliminated.

Furthermore, in this embodiment, the processing device 400 further includes the selector unit 420. Thus, in this embodiment, without concerning the difference between the measuring probe 300 and the measuring probe 301, the measuring probe 300, 301 can be connected to the coordinate measuring machine main body 200, so that the measuring probe 300 and the measuring probe 301 can be automatically recognized. Note that the present invention is not limited thereto and, when a measuring probe having no second identification code is connected to the coordinate measuring machine main body, the measuring probe may also be manually connected to the probe signal processing I/F unit. That is, the selector unit may also be eliminated.

Furthermore, in this embodiment, the first identification code 330, 331 is outputted as analog data from the measuring probe 300, 301. That is, outputting the first identification code 330, 331 from the measuring probe 300, 301 does not require complicated control or arrangement but only a simplified technique. Furthermore, the first identification code 330, 331 is identified by a resistance value. Thus, in this embodiment, since the conventional technique for recognizing measuring probes that are specified by the resistance value can be used without being changed, the conventional measuring probe 301 can also be used without any change made thereto. Note that the present invention is not limited thereto and the first identification code, which may be analog data, can also be specified in the capacity or impedance. As a matter of course, the first identification code may also be outputted as digital data. Then, the first identification code may be outputted not only via electrical wiring but also wirelessly.

Furthermore, in this embodiment, the second identification code 340 is outputted as digital data from the measuring probe 300. Thus, as compared with the second identification code 340 that is analog data, it is possible to easily increase the amount of information and reduce the possibility of a code error occurring. Note that the present invention is not limited thereto, and the second identification code may also be outputted as analog data. Then, the second identification code may be outputted not only via electrical wiring but also wirelessly.

Furthermore, in this embodiment, the processing device 400 includes the communication portion 433 configured to output the second identification code 340 from the measuring probe 300. Thus, in this embodiment, it is possible to operate the measuring probe 300 with efficiency in terms of power (in a low consumption mode). At the same time, since the second identification code 340 is not outputted when the first identification code 330 is outputted to identify the first identification code 330, it is possible to prevent the second identification code 340 from exerting an influence on identifying the first identification code 330. Specifically, suppose that the first identification code 330 is analog data and the second identification code 340 is digital data, and the two pieces of data are outputted at the same time. In this case, such a problem may also occur in which care must be taken on wiring because the second identification code 340 is prone to exert a significant influence on the signal level of the first identification code 330. That is, in this embodiment, such a problem can be prevented from occurring. Note that in this embodiment, the first identification code 330 is also outputted when the second identification code 340 is outputted to identify the second identification code 340. However, the second identification code 340 is digital data and thus hardly influenced by the first identification code 330 that is analog data. The present invention is not limited thereto, and the second identification code may also be outputted from the measuring probe not under the condition that the first identification code is matched with the matching code MC.

Furthermore, in this embodiment, the second identification code 340 includes the specific information 342 of the probe main body 302 and the specific information 344 of the stylus module 304. That is, in this embodiment, even when the stylus module 304 and the probe main body 302 are changed, the second identification code 340 can completely cover the combinations thereof. Note that the present invention is not limited thereto, and the measuring probe may not be separated into the stylus module and the probe main body but may be configured integrally. As a matter of course, the measuring probe may include the stylus module and the probe main body, and the second identification code may include only the specific information of the probe main body.

Furthermore, in this embodiment, the specific information 342 of the probe main body 302 has information relating to the type, shape, weight, and center of gravity of the entirety of the probe main body 302 and the individual component of the probe main body 302, and the specific information 344 of the stylus module 304 has information relating to the type, shape, weight, and center of gravity of the entirety of the stylus module 304 and the individual component of the stylus module 304. Thus, in this embodiment, it is possible to recognize the measuring probe 300 with great accuracy using the specific information 342 and 344. Note that the present invention is not limited thereto, and each specific information may also include only information (factor) relating to any one of the type, shape, weight, and center of gravity of the entirety or the individual component. Of these factors (information), identifying a measuring probe with the most influential factor when measurement is made with the measuring probe enables it to quickly execute the identification step of the measuring probe and prevent an increase in the amount of information of the second identification code, thereby implementing reasonably practical use. As a matter of course, each specific information may not need to include any information relating to the type, shape, weight, and center of gravity of the entirety or the individual component.

Furthermore, in this embodiment, each specific information 342, 344 may have manufacturer information. In this embodiment, this makes it possible to calibrate even a slight difference in measurement property between measuring probes 300 that may come from a difference between manufacturers. Note that the present invention is not limited thereto, and each specific information may also have no manufacturer information.

Furthermore, in this embodiment, the probe main body 302 is made separable into a plurality of modules, and the specific information 342 can further have information relating to the plurality of modules. That is, in this embodiment, even when a combination of the modules is changed, grasping information relating to each of the plurality of modules enables accurate reflection of the change. Note that the present invention is not limited thereto, and the specific information of the probe main body needs not to have information relating to all of the plurality of modules but may only have information relating to some modules concerning measurement properties.

Furthermore, in this embodiment, the specific information 344 further has information relating to the stem 304B. Thus, in this embodiment, it is possible to take information relating to the length of the stem 304B accurately into the second identification code 340. Furthermore, even when the stem 304B is extended by an extension bar, a change in the stylus module 304 caused by the extension bar can be automatically reflected on the specific information 344 by the technique below. For example, the technique is to further provide the probe main body 302 with a weight sensor or to use a suspension mechanism configured to support the stylus module 304. First, with the measuring probe 300 at a standstill, a change in the weight of the stylus module 304 is detected. Then, a change in inertial moment when the measuring probe 300 is moved and stopped is used to detect a change in the position of the center of gravity of the stylus module 304. Then, on the basis of those amounts of change, the correct weight and center of gravity are determined. Note that the present invention is not limited thereto, and the specific information may also have no information relating to the stem.

Still furthermore, in this embodiment, the processing device 400 reads the calibration information 336 from the storage portion 335 to compute shape coordinates on the basis of the calibration information 336. Thus, in this embodiment, it is possible to calibrate the measurement properties of each measuring probe 300. That is, in this embodiment, even when the object to be measured W is measured with a plurality of different measuring probes 300, the shape coordinates determined by the computation using the calibration information can be made independent of the measurement properties of each measuring probe 300. Note that the present invention is not limited thereto, and it is also acceptable to perform no calibration on the shape coordinates determined by a measuring probe but only to recognize the measuring probe in order to make clear the identity of the measuring probe. Note that in this embodiment, the measuring probe 300 includes the storage portion 335 for storing the calibration information 336. However, the processing device may include a storage portion configured to store calibration information.

Furthermore, in this embodiment, the master I/F unit 430A and the slave I/F unit 430B are configured in the same manner. Thus, in this embodiment, it is possible to facilitate the design and manufacture of the master I/F unit 430A and the slave I/F unit 430B. Furthermore, the master I/F unit 430A and the slave I/F unit 430B differ from each other in that the units are located upstream or downstream when connected in series and can thus be used for two mutually different measuring probes 300. Thus, in this embodiment, since the master I/F unit 430A and the slave I/F unit 430B may only have to be prepared depending on the number of the measuring probes 300 to be used, the master I/F unit 430A and the slave I/F unit 430B can be made readily available for the measuring probes 300. Note that the present invention is not limited thereto, and the master I/F unit and the slave I/F unit may not have to be configured in the same manner.

Furthermore, in this embodiment, the processing device 400 includes the downstream determination portions 435 the number of which corresponds to the number of the measuring probes 300 to be recognized. Thus, in this embodiment, even when the measuring probes 300 are significantly different from each other, the downstream determination portions 435 do not need to match, with each other, the determination factor, the determination sequential order, and the determination reference at the downstream determination portions 435. That is, in this embodiment, it is possible to optimally configure the downstream determination portion 435 in identifying the second identification code 340 and recognizing each measuring probe 300. Note that the present invention is not limited thereto, and the probe signal processing I/F unit may only include the storage portions the number of which corresponds to the number of the measuring probes, so that one downstream determination portion may be employed to be common to the plurality of measuring probes. That is, the invention may be configured in a manner such that one probe signal processing I/F unit is employed to make a plurality of measuring probes available. In this case, the probe signal processing I/F unit can be minimized, and the processing device can be reduced in size and costs.

That is, in this embodiment, it is possible to recognize a number of measuring probes 300, 301 with efficiency.

The present invention has been described with reference to the aforementioned embodiments. However, the present invention is not limited to the aforementioned embodiments. That is, improvements and changes in design may be made without departing from the scope and spirit of the present invention.

For example, although in this embodiment, the measuring probe 300, 301 is a scanning probe, but it may also be a touch trigger probe or a non-contact optical probe. Then, the contact part may not have to be spherical in shape, but may also have a disc shape, for example.

Furthermore, in this embodiment, the measuring probe 300, 301 is connected to the coordinate measuring machine main body 200 to constitute a coordinate measuring unit. However, the measuring probe may also be connected to the main body of a machine tool instead of a tool so as to constitute a coordinate measuring unit.

Furthermore, in this embodiment, the measuring probe 300, 301 is supplied with power by the coordinate measuring machine main body 200 or the processing device 400. However, the present invention is not limited thereto, and may also be configured such that the measuring probe itself includes a power source.

The present invention can be widely applied to coordinate measuring units configured to measure the three-dimensional shape of an object to be measured.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

What is claimed is:

1. A coordinate measuring unit comprising;
   a measuring probe; and
   a processing device configured to compute shape coordinates of an object to be measured on a basis of an output of the measuring probe, wherein
   the measuring probe has a first identification code; and
   the processing device includes
      a first determination portion configured to determine whether the first identification code outputted from the measuring probe is matched with a matching code, and
      a downstream determination portion configured to identify a second identification code outputted from the measuring probe to thereby recognize the measuring probe when the first identification code is matched with the matching code in the first determination portion and the measuring probe further has the second identification code; and
      a communication portion configured to, when the first identification code is matched with the matching code in the first determination portion, send to the measuring probe a request for output of the second identification code and causes the measuring probe to output the second identification code.

2. The coordinate measuring unit according to claim 1, wherein a selector unit of the processing device causes the first identification code to be output from the measuring probe by supplying power to a resistor corresponding to the first identification code of the measuring probe, and
   a probe signal processing I/F unit of the processing device starts communication between the communication portion and a communication portion of a communication unit of the measuring probe by supplying power to the communication unit.

3. The coordinate measuring unit according to claim 2, wherein the processing device further includes a second determination portion configured to, when the first identification code is not matched with the matching code, identify the first identification code to thereby recognize the measuring probe.

4. The coordinate measuring unit according to claim 3, wherein the selector unit is configured to output the first identification code to the first determination portion when the first identification code is matched with the matching code, and to output the first identification code to the second determination portion when the first identification code is not matched with the matching code.

5. The coordinate measuring unit according to claim 2, wherein the probe signal processing I/F unit of the processing device supplies power to the entire measuring probe when the measuring probe has been recognized.

6. The coordinate measuring unit according to claim 1, wherein the first identification code is outputted as analog data from the measuring probe.

7. The coordinate measuring unit according to claim 1, wherein the second identification code is outputted as digital data from the measuring probe.

8. The coordinate measuring unit according to claim 1, wherein
the measuring probe includes a stylus module having a contact part configured to detect the object to be measured, and a probe main body configured to support the stylus module, and
the second identification code includes specific information of the probe main body and specific information of the stylus module.

9. The coordinate measuring unit according to claim 8, wherein the specific information of the probe main body has information relating to at least one of a type, a shape, a weight, and a center of gravity of an entirety of the probe main body and an individual component of the probe main body, and the specific information of the stylus module has information relating to at least one of a type, a shape, a weight, and a center of gravity of an entirety of the stylus module and an individual component of the stylus module.

10. The coordinate measuring unit according to claim 9, wherein each of the specific information of the probe main body and the specific information of the stylus module further has manufacturer information.

11. The coordinate measuring unit according to claim 8, wherein the probe main body is made separable into a plurality of modules, and the specific information of the probe main body further has information relating to the plurality of modules.

12. The coordinate measuring unit according to claim 8, wherein the stylus module includes a stem configured to support the contact part, and the specific information of the stylus module further has information relating to the stem.

13. The coordinate measuring unit according to claim 1, further comprising a storage portion configured to store calibration information of the measuring probe, wherein the processing device reads the calibration information corresponding to the recognized measuring probe from the storage portion and computes the shape coordinates using the calibration information.

14. The coordinate measuring unit according to claim 1, wherein the processing device includes the downstream determining determination portions a number of which corresponds to a number of the measuring probes to be recognized.

15. A method for recognizing a measuring probe in a coordinate measuring unit configured to compute shape coordinates of an object to be measured on a basis of an output of a measuring probe, the method comprising:
determining whether a first identification code which is outputted from the measuring probe and which the measuring probe has is matched with a matching code;
requesting the measuring probe for output of the second identification code to thereby output a second identification code from the measuring probe when the first identification code is matched with the matching code; and
identifying the second identification code outputted from the measuring probe to thereby recognize the measuring probe when the measuring probe further has the second identification code.

16. The method for recognizing a measuring probe according to claim 15, further comprising, when the first identification code is not matched with the matching code by the determination, recognizing the measuring probe by identifying the first identification code.

* * * * *